Patented July 5, 1949

2,475,297

UNITED STATES PATENT OFFICE 2,475,297

CATALYTIC POLYMERIZATION OF ALLYL ESTERS

Edward C. Shokal, Oakland, and Franklin A. Bent, Berkeley, Calif., assignors to Shell Development Company, San Francisco, Calif., a corporation of Delaware No Drawing. Application November 6, 1946, Serial No. 708,199

8 Claims. (Cl. 260—89.1)

This invention relates to a process of catalytically polymerizing allyl esters. More particularly, the invention pertains to a method wherein copper is employed to catalyze polymerization of allyl esters of saturated fatty acids.

Metallic copper and various copper compounds have long been recognized by those skilled in the polymerization art as possessing a definite inhibiting effect towards polymerization reactions. Accordingly, this property of copper has been advantageously used to inhibit or prevent polymerization of allyl esters which form resinous polymers by additive polymerization. Thus, in esterifying allyl alcohol with dicarboxylic acids the resulting allyl ester is prevented from polymerizing by effecting the esterification in the presence of copper or its alloys according to U. S. Patent 2,249,768. Moreover, U. S. Patent 2,273,891 describes a process wherein allyl esters are polymerized and the polymerization is interrupted by addition of copper to the polymerizing mixture. These patents show the inhibiting action of copper in the polymerization of allyl esters. We also found that copper inhibits polymerization of allyl esters when the polymerization was effected at the temperatures described in the above-noted patents. However, when we effected polymerization at higher temperatures, a surprising and unexpected phenomenon was encountered. We discovered that when a certain critical temperature was reached, copper no longer had an inhibiting effect upon the polymerization. Furthermore, we found that when still higher temperatures were employed, the presence of copper actually accelerated the rate of polymerization with allyl esters.

The unusual behavior of copper toward polymerization of allyl esters of saturated fatty acids will be evident from consideration of results with a typical ester, allyl acetate, as given in Table I below. The ester was heated at the noted temperature and time in sealed glass tubes containing a small vapor space to allow for expansion which was filled with carbon dioxide gas or nitrogen. Upon completion of the heating, the tubes were cooled, opened and the monomeric allyl acetate rapidly distilled in vacuo from the formed polyallyl acetate in order to determine the amount of polyallyl acetate formed and the extent of polymerization.

Table I

| Temp., °C. | Catalyst | Time, hrs. | Percent Polymer |
|---|---|---|---|
| 210 | None | 65 | 54 |
| 210 | 7.5% Cu screen | 65 | 80 |
| 205 | 5% Cu screen | 65 | 71 |
| 195 | None | 46 | 34 |
| 185 | 5% Cu screen | 65 | 35 |

The foregoing results show that metallic copper has a marked effect in catalyzing the polymerization of allyl acetate at 210° C. and 205° C. At 195° C. heat alone converted 34% of the allyl acetate to polymer in 46 hours. When copper was present at only ten degrees lower temperature, namely, at 185° C., heating for the longer time of 65 hours gave only 35% polymer. These results show that at about 190° C. copper has neither an inhibitory nor an accelerating effect upon the polymerization of allyl esters of a saturated fatty acid. In other words, copper displays a neutral behavior at about 190° C. We now utilize this unexplainable catalytic phenomenon of copper toward polymerization of allyl esters in the process of our invention.

According to the process of the invention an allyl ester of a saturated monocarboxylic acid is polymerized in liquid phase under non-oxidizing conditions in the presence of copper at a temperature from about 200° C. to below the temperature at which decomposition becomes appreciable. The upper limit of the temperature range at which decomposition of the allyl ester becomes appreciable is above about 350° C. We therefore prefer to operate at temperatures of about 200° C. to 350° C. Since the polymerization reaction must be effected with the ester in liquid phase, the pressure necessary at the higher range of temperature becomes very high with the lower ester and we therefore prefer to operate at temperatures of about 210° C. to 280° C.

The copper employed as catalyst in the process need not be in any special form. The choice of the physical character of the copper catalyst is dependent mainly upon convenience and efficiency. Ordinarily a fine powder of metallic copper is preferred although coarse powdered copper, copper screen, or an undivided solid mass may be used. Colloidal copper is useful. Another useful form is spongy copper obtained in usual fashion by electrolytic deposition. Copper alloys are also suitable. Preferably such alloys contain a substantial amount of copper, i. e. 20% or more of copper. Among useful alloys are Monel metal, brass, constantan, bronze, Bell metal and German silver.

In general, metallic copper in substantially pure form is more active as a catalyst than the alloys. This will be evident from the results given in Table II below wherein Monel metal was employed as catalyst. The polymerization was effected in the same manner as that used to obtain the results given in Table I. For comparison, certain of those results are repeated.

Table II

| Temp., °C. | Catalyst | Time, hrs. | Per cent Polymer |
|---|---|---|---|
| 210 | None | 65 | 54 |
| 210 | Cu screen | 65 | 80 |
| 210 | Monel screen | 65 | 69 |

The polyallyl acetate obtained when Monel metal was used as catalyst as noted in Table II above was typical of the polymers produced in the process of the invention. The polyallyl acetate was a very viscous liquid after separation from monomeric allyl acetate by distillation of the latter therefrom in vacuo. It had a refractive index (20/D) of 1.4752. Cryoscopic measurement in glacial acetic acid showed a molecular weight of 810 while measurement in benzene gave a value of 803. This indicated the average degree of polymerization was about 8, i. e. the polyallyl acetate contained 8 monomer units therein. The polyallyl acetate had an ester value of 0.95 equivalents per 100 grams. The theoretical value is 1.00.

Copper salts also catalyze the polymerization above the critical temperature limit. For this purpose such copper salts as cupric chloride, cuprous chloride, cupric chromate, cupric formate, acetate, propionate or butyrate, cupric phosphate, cupric sulfate, and the like can be used. The results with several copper salts as sole polymerization catalyst for allyl acetate are given in Table III below.

Table III

| Temp., °C. | Catalyst | Time, hrs. | Per Cent Polymer |
|---|---|---|---|
| 210 | None | 65 | 54 |
| 210 | Metallic Cu | 65 | 80 |
| 210 | Cupric acetate | 65 | 66 |
| 210 | Cuprous chloride | 65 | 72 |

The copper salts like metallic copper also display an inhibitory effect on polymerization of the allyl esters at temperatures below the neutral point. For example, allyl acetate in the presence of cupric acetate was refluxed in a glass vessel fitted with a reflux condenser. Allyl acetate refluxes at about 105° C. A stream of nitrogen was flowed into the reflux condenser in order to keep the refluxing ester out of contact with oxygen of the air. The refractive index (20/D) was taken of the allyl acetate at the start and at several times during the heating. As polymerization occurs the refractive index of the polymerizing mixture increases. The extent of refractive index increase is directly related to the percentage of polymer formed and contained in the solution of monomer and polymer. For convenience of expression we define 0.0001 of refractive index increase as one RI unit. While allyl acetate is being polymerized, formation of about 25% polyallyl acetate gives an increase of refractive index of about 180 RI units. The results given in Table IV below show the marked inhibitory action of cupric acetate on the polymerization of allyl acetate at 105° C.

Table IV

| Time | Catalyst | |
|---|---|---|
| | None | Cupric Acetate |
| 53 hrs | 13 | 2 |
| 372 hrs | 35 | 6 |

Copper, an alloy thereof, or copper salt is suitable for catalyzing polymerization at about 200° C. and upwards of an allyl ester of any saturated fatty acid. There may be employed in the process of the invention an allyl ester of such acids as formic, acetic, propionic, butyric, isobutyric, caproic, capryllic, capric, lauric, palmitic, stearic, or behenic. Preferably there is used an allyl ester of a saturated monocarboxylic acid containing from 1 to 8 carbon atoms.

The process of the invention is particularly adapted to continuous production of polyallyl esters of a saturated fatty acid. The ester is pumped continuously into the reactor so that no vapor space is present therein, i. e. the liquid ester entirely fills the reactor. The reactor ordinarily contains the copper catalyst as a fixed bed or mass or, if desired, the catalyst in powdered or colloidal form to be flowed in with the ester. Copper tubing is well suited as reactor material. The reactor is maintained at the operating temperature of 200° C. and upwards as previously described. The ester is flowed in at such a rate that the residence time in the reactor is sufficient to permit formation of substantial proportion of polymer, e. g. 10% or higher. The rate of flow needed for a desired amount of polymerization is dependent upon the particular allyl ester, the catalyst and the temperature. It is easily ascertained by trial wherein samples of the product are subjected to rapid distillation for removal of the unpolymerized monomeric ester preferably under vacuum of about 50 mm. pressure. Vacuum distillation is used in this determination to avoid further thermal polymerization during the distillation which would make inaccurate the value of the polymer formation in the reactor. The product from the reactor is a solution of monomer and polymer which is continuously withdrawn and subjected to distillation for recovery of the polymer. This distillation may be effected at ordinary pressure with the lower allyl ester although with those which boil above 200° C. at atmospheric pressure, the product is best distilled at reduced pressure, i. e. 200 mm. and lower. This continuous method is an excellent procedure for polymerizing the allyl esters. For example, allyl acetate was passed through a tubular reactor at about 280° C. where it was maintained entirely in liquid phase by use of superatmospheric pressure. The rate of flow was such that it was contacted with catalyst consisting of cupric chloride mounted on pumice for about 49 minutes. These conditions caused about 32.5% of the allyl acetate to be converted to polyallyl acetate.

In the process of the invention it is essential that the allyl ester be in liquid phase during contact with the copper catalyst in order for polymerization to occur. This is readily attained by use of higher pressures than the total vapor pressure of the polymerization mixture at the operating temperature. Contact of the allyl ester in vapor phase with the copper catalyst does not produce the desired polymerization and, if anything, usually results in some decomposition of the ester. For example, allyl acetate was passed over copper turning at about 277° C. under normal pressure at a contact time of about 20 seconds. There was produced about 0.03 volumes of gas (N.T.P.) per volume of liquid allyl acetate feed measured at about 20° C. Only liquid, but vaporizable, product was recovered which appeared to be substantially pure allyl acetate with no polymer of any kind being formed. When the temperature was increased to about 343° C. with a contact time of about 12 seconds, the gas produced increased to about .08 volume per volume of feed. The liquid product was again largely allyl acetate although about 0.25% of non-volatile residue was produced. Tests show this was not polyallyl acetate and that it apparently was polyacrolein. Examination of the gas produced showed it to consist of carbon dioxide and hydrocarbon, probably methane.

In using copper or its alloys in the process of the invention, the polymerization is effected under non-oxidizing conditions. Allyl esters contain an olefinic group therein which is quite susceptible to oxidation. Copper is also a very active oxidation catalyst at the temperature employed in the process of the present invention. If an allyl ester is brought in the presence of copper into contact with an oxidizing agent such as air or other oxygen-containing gas at the operating temperatures of the present invention, oxidation or hydroxylation of the allyl ester will occur to the exclusion of the much slower and insensitive additive polymerization reaction. For example, see U. S. Patent 2,316,604. Since the object of the present invention is to provide an efficient process for polymerizing the allyl esters, the process is effected under non-oxidizing conditions, i. e. in the absence of oxygen-containing gases or other oxidizing agents. Preferably the process is effected in the aforementioned continuous manner where the polymerizing mixture completely fills the reaction zone containing the copper catalyst. If it is desired to effect the reaction in a batchwise manner where there is a vapor space in contact with the polymerization ester and the copper catalyst, this space is maintained devoid of oxygen by using a blanket of inert gas such as nitrogen, carbon dioxide or methane.

One of the advantageous features of the process of the invention is that the catalyst cost is negligible. Copper in itself is quite cheap and the copper employed in the process can be used over and over to polymerize the allyl esters. On the other hand, the ordinary peroxide catalysts are usually somewhat expensive and are lost after being used to effect polymerization. Furthermore, peroxides like benzoyl peroxides besides being polymerization catalysts are also powerful oxidizing agents. As explained above, the presence of oxidizing agents in combination with copper at the operating temperatures of the present invention is to be avoided in order to prevent oxidation. We therefore employ metallic copper or its alloys or copper salts as sole polymerization agent in the process and operate in the absence of peroxide catalysts and/or oxygen-containing gases.

It is ordinarily desirable to effect the polymerization of the allyl ester in bulk. If desired, inert solvents can be used such as toluene or xylene. However, the presence of such solvents markedly decreases the rate of polymerization. Likewise, the polymerization is preferably effected in the absence of non-solvents such as water. The presence of water with some of the catalysts like copper salts is actually harmful since they tend to become washed out. It is therefore preferable to effect the polymerization under substantially anhydrous conditions.

While we have described the invention with particular reference to polymerization of allyl esters, the method is also applicable to corresponding esters of other beta,gamma-monoolefinic monohydric alcohols in general. Thus, the process of the invention enables catalytic polymerization of saturated monocarboxylic acid esters of such alcohols as methallyl alcohol, ethallyl alcohol, crotyl alcohol, methyl vinyl carbinol, 2-pentenol, 2-hexenol, etc. Such beta,-gamma-monoolefinic monohydric alcohols contain the olefinic double bond between the two carbon atoms which are in beta and gamma positions with respect to the saturated alpha carbon atom containing the aromatic hydroxyl group linked directly thereto. While such unsaturated alcohols containing any number of carbon atoms above two may be employed in the process in the form of their saturated fatty acid esters, preferably esters of alcohols containing 3 to 6 carbon atoms, inclusive, are used.

This application is a continuation-in-part of our copending application, Serial No. 499,728, filed August 23, 1943, now abandoned.

We claim as our invention:

1. A process for producing a polymeric ester from a beta,gamma-monoolefinic monohydric alcohol ester of a saturated fatty acid which comprises catalytically polymerizing said ester in the presence of a sole polymerization catalyst which is a member of the group consisting of copper, copper alloys and copper salts, under anhydrous non-oxidizing conditions in liquid phase at 200° C. to below the temperature at which decomposition of said ester becomes appreciable.

2. A process for producing a polymeric ester from an allyl ester of a saturated monocarboxylic acid which comprises catalytically polymerizing said ester in the presence of copper as sole polymerization catalyst under anhydrous non-oxidizing conditions in liquid phase at about 200° C. to 350° C.

3. A process for producing a polyallyl ester from an allyl ester of a saturated monocarboxylic acid containing up to 8 carbon atoms which comprises catalytically polymerizing said ester in the presence of copper as sole polymerization catalyst under anhydrous non-oxidizing conditions in liquid phase at about 210° C. to 280° C.

4. A process for producing polyallyl acetate which comprises contacting liquid allyl acetate with a substance, as sole polymerization catalyst, from the group consisting of copper, copper alloys and copper salts, said contacting being effected under non-oxidizing conditions at a temperature of from about 200° C. to 350° C.

5. A process for producing polyallyl acetate, which comprises catalytically polymerizing liquid allyl acetate in the presence of copper as sole polymerization catalyst under anhydrous non-oxidizing conditions at a temperature of about 210° C. to 280° C.

6. A process for producing polyallyl formate, which comprises contacting liquid allyl formate with a substance, as sole polymerization catalyst, from the group consisting of copper, copper alloys and copper salts, said contacting being effected under anhydrous non-oxidizing conditions at a temperature of from about 200° C. to 350° C.

7. A process for producing polyallyl formate, which comprises catalytically polymerizing liquid allyl formate in the presence of copper as sole polymerization catalyst under anhydrous non-oxidizing conditions at about 210° C. to 280° C.

8. A process for producing a polyallyl ester, which comprises catalytically polymerizing an allyl ester of a saturated fatty acid containing up to 8 carbon atoms in liquid phase in the presence of a copper salt as sole polymerization catalyst under anhydrous non-oxidizing conditions at about 210° C. to 280° C.

EDWARD C. SHOKAL.
FRANKLIN A. BENT.

REFERENCES CITED

The following references are of record in the file of this patent:

UNITED STATES PATENTS

| Number | Name | Date |
| --- | --- | --- |
| 2,160,933 | Wiley | June 6, 1939 |
| 2,374,081 | Dean | Apr. 17, 1945 |

OTHER REFERENCES

Berkman et al. "Catalysis," pub. by Reinhold Pub. Corp., N. Y., 1940, pages 961, 964, 965, 972, 973, 980–2, 984, 985.